US005814566A

United States Patent [19]

Schlueter, Jr. et al.

[11] Patent Number: 5,814,566

[45] Date of Patent: Sep. 29, 1998

[54] BELT ASSEMBLY

[75] Inventors: Edward L. Schlueter, Jr., Rochester; Lucille M. Sharf, Pittsford; Kevin J. Teed, Webster's Crossing, all of N.Y.

[73] Assignee: Xerox Corporation, Stamford, Conn.

[21] Appl. No.: 812,219

[22] Filed: Mar. 6, 1997

[51] Int. Cl.[6] ............................ B32B 27/08; B65G 15/34

[52] U.S. Cl. ................................ 442/88; 442/93; 442/98; 442/104; 198/793; 198/804; 355/133; 428/192

[58] Field of Search ............................ 428/192; 355/133; 198/793, 804; 442/88, 93, 98, 104

[56] References Cited

U.S. PATENT DOCUMENTS

| | | | |
|---|---|---|---|
| 4,060,814 | 11/1977 | Urciuoli et al. | 346/139 A |
| 4,172,035 | 10/1979 | Adams | 210/232 |
| 4,572,359 | 2/1986 | Fujita et al. | 198/819 |
| 4,703,566 | 11/1987 | Kwoka | 34/78 |
| 5,298,956 | 3/1994 | Mammino et al. | 355/275 |
| 5,538,676 | 7/1996 | Bielfeldt | 264/109 |

*Primary Examiner*—Richard Weisberger
*Attorney, Agent, or Firm*—Zosan S. Soong

[57] ABSTRACT

There is disclosed a belt assembly including: (a) an endless belt capable of repeated cycling over rollers having a first side edge and a second side edge and defining a center region between two side regions, wherein a low friction composition comprised of a fluoropolymer covers a portion of the length of the first side edge; and (b) a belt guide apparatus which contacts the first side edge during cycling of the belt to position the belt on the rollers, wherein the low friction composition reduces the wear of the belt at the first side edge.

13 Claims, 1 Drawing Sheet

BELT ASSEMBLY

FIELD OF THE INVENTION

This invention relates to a belt assembly having belt side edges coated with a low friction composition to minimize edge wear caused by belt guide apparatus

BACKGROUND OF THE INVENTION

Belts are common components in many different types of equipment. A belt cycled over rollers generally needs to be steered or positioned on the rollers, i.e., lateral movement of the belt needs to be restrained, otherwise the belt will move partially or completely off the rollers during repeated cycling. Conventional equipment and methods used to position the belt include “active steering”. Active steering is a vane or sensing device that feeds position information back to a steering roller. The steering roller then puts more tension on one side of the belt to cause the belt to steer in the desired direction. This device is very precise and has high costs. A medium priced belt steering system is the low lateral force system. This requires several rollers that have flexable vanes attached, cut or molded onto a metallic shaft. When the belt starts to drift off of the normal position the flexable vanes create a force to steer the belts back into position. This system again is expensive due to the low lateral force roller cost. The most cost effective conventional steering system is using belt guide apparatus such as edge guides that contact one or both side edges of the belt to position the belt on the rollers. This leads, however, to the eventual failure of the belt by wearing and cracking at the belt side edges. Thus, there is a need, which the present invention addresses, for new belt assemblies that exhibit improved wear resistance on the belt side edges, wherein the improvement in wear resistance is relatively simple and inexpensive to implement.

The following documents disclose conventional belt assemblies: Fujita et al., U.S. Pat. No. 4,572,359; Bielfeldt, U.S. Pat. No. 5,538,676; Kwoka, U.S. Pat. No. 4,703,566; Urciuoli et al., U.S. Pat. No. 4,060,814; and Adams, U.S. Pat. No. 4,172,035.

SUMMARY OF THE INVENTION

The present invention is accomplished in embodiments by providing a belt assembly comprising:

(a) an endless belt capable of repeated cycling over rollers having a first side edge and a second side edge and defining a center region between two side regions, wherein a low friction composition comprised of a fluoropolymer covers a portion of the length of the first side edge; and (b) a belt guide apparatus which contacts the first side edge during cycling of the belt to position the belt on the rollers, wherein the low friction composition reduces the wear of the belt at the first side edge.

BRIEF DESCRIPTION OF THE DRAWINGS

Other aspects of the present invention will become apparent as the following description proceeds and upon reference to the Figures which represent preferred embodiments.

Unless otherwise noted, the same reference numeral in different Figures refers to the same or similar feature.

DETAILED DESCRIPTION

Figure 1:
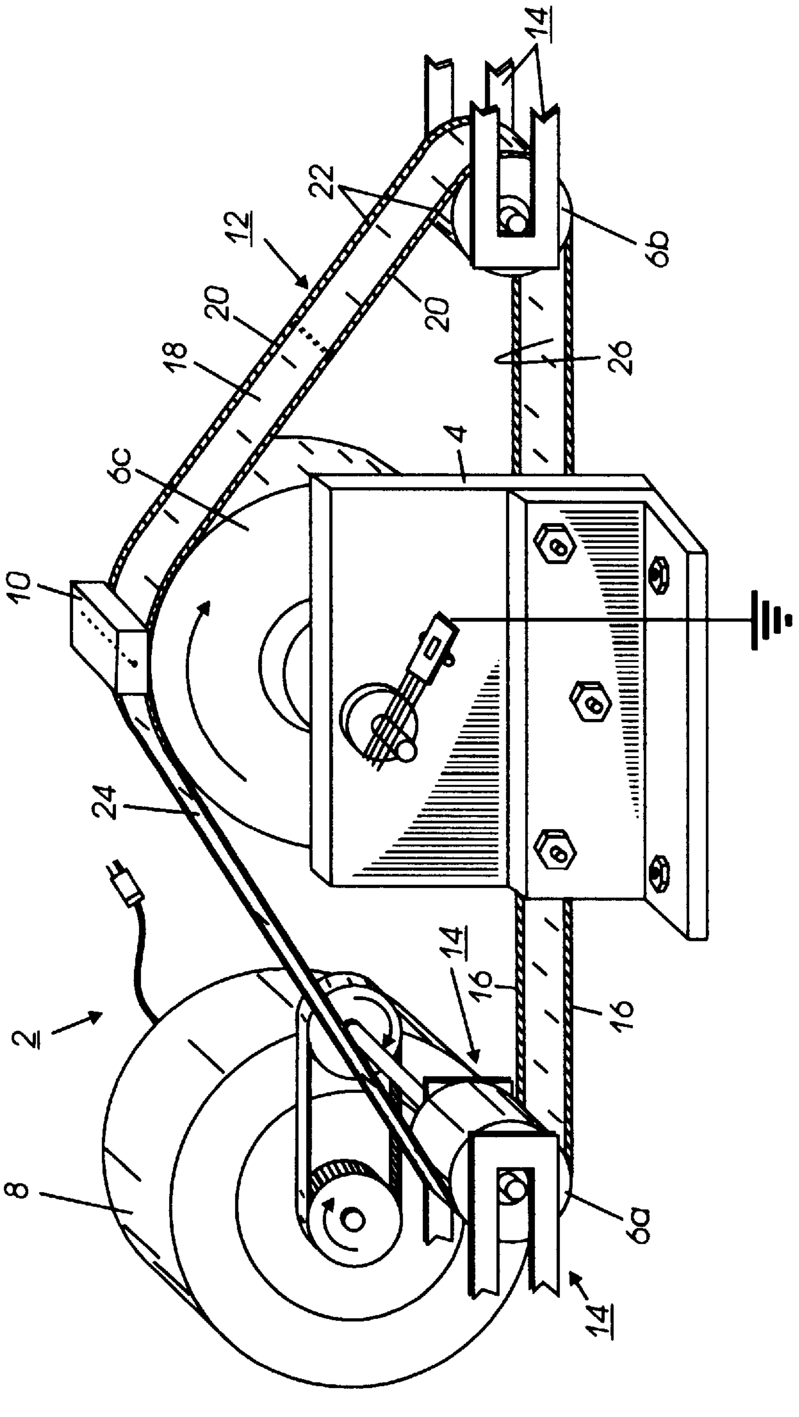
FIG. 1 represents a schematic illustration of the inventive belt assembly in a testing fixture wherein the testing fixture is a modified photoreceptor housing assembly from the Xerox 5028 copier.

In FIG. 1, the modified photoreceptor housing assembly 2 includes a mounting bracket 4, a plurality of rollers (6*a*,6*b*,

6*c*), motor 8, corotron 10, belt 12, and belt guide apparatus 14, which is depicted as a pair of belt edge guide members at each roller (6*a*,6*b*). The belt has two side edges 16 and defines a center region 18 between two side regions 20. The division of the belt into the center region and the two side regions is to facilitate discussion so in embodiments of the present invention there are no actual seams between these regions, although seams could be present if for example three strips of material are joined lengthwise to form the belt. A low friction composition 22, which is depicted in the form of a tape adhered to the belt, covers the two side regions 20 along both their outer surface 24 and inner surface 26 and covers the entire length of the two side edges 16. Optionally, the low friction composition is present solely along one side edge or both side edges without being present elsewhere on the belt. In embodiments, the low friction composition may be present along a portion of the length of one side edge or along a portion of the lengths of both side edges.

The low friction composition includes fluoropolymer TEFLON™ type materials such as polytetrafluoroethylene, fluorinated ethylene-propylene copolymer, tetrafluoroethylene-ethylene copolymer, and perfluoroalkoxy polymer. The fluoropolymer preferably is polymerized from monomers having from one to four carbon atoms, more preferably from monomers having from two to three carbon atoms. Fluoropolymers are available for example from DuPont. The low friction composition may be in the form of a tape such as HM350™, available from the Furon Company, which is believed to be polytetrafluoroethylene with a silicone adhesive. When present on the belt, the low friction composition has a thickness ranging from 0.3 mm to about 2 mm, preferably from about 0.5 mm to about 1 mm.

As seen in FIG. 1, the belt guide apparatus may be rigidly fixed in position adjacent each roller (6*a*,6*b*).

During cycling of the belt over the rollers, the belt will have a tendency to shift laterally along the rollers, but will be steered back to into position by the belt guide apparatus such as by blocking the lateral movement of the belt along the rollers.

The belt is flexible and may be elastic. Preferably, the entire belt is free of any protuberance and any opening, i.e., having a relatively smooth surface, expecially on the outer surface of the center region which may be for example the imaging portion of a photoconductive member. The belt may be seamed or seamless and may be fabricated by any conventional method such as that disclosed in Yu et al, U.S. Pat. No. 5,273,799, the disclosure of which is totally incorporated herein by reference. The belt may be used in any suitable machine, but in preferred embodiments, the belt may be a fusing subsystem member (such as a fuser belt, a pressure belt, or a donor belt), an intermediate toner image transfer member, a paper transport member, or a photoconductive member, these examples being of belts used in electrostatographic printing machines. Illustrative materials used in these belts for electrostatographic printing machines, including electrically conductive particles, thermally conductive particles, and photoconductive material, are found in Badesha et aL, U.S. Pat. No. 5,576,818; Yuh et aL, U.S. Pat. No. 5,532,093; Badesha et al, U.S. Pat. No. 5,480,938, the disclosures of which are totally incorporated herein by reference.

A preferred belt material is a polyimide available as KAPTON™ from DuPont, which is believed to be a copolyimide prepared by: imidization of a copolyamic acid solution, reacting two aromatic tetracarboxylic acids, biphenyltetracarboxylic acid and pyromellitic acid, with two aromatic diamines, p-phenylenediamine and diaminodiphenyl ether, as described in the U.S. Pat. No. 5,166,308.

The invention will now be described in detail with respect to specific preferred embodiments thereof, it being understood that these examples are intended to be illustrative only and the invention is not intended to be limited to the materials, conditions, or process parameters recited herein. All percentages and parts are by weight unless otherwise indicated.

EXAMPLE 1

Four identical belts were prepared having the following dimensions: 380 mm×835 mm×0.003 inch. The belt material was a polyimide available as KAPTON™ from DuPont. One belt had no side edge reinforcement. The other belts had their side regions and side edges covered with different kinds of tape (about ½ inch of tape was used to wrap each side edge with about ¼ inch of overlap for the outer and inner surfaces of the side regions) in the manner illustrated in FIG. 1, with one belt reinforced with duct tape (Shurtape P-618), another belt reinforced with KAPTON™ KM102 tape, and the fourth belt reinforced with HM350™, tape (TEFLON™ type). The duct tape (a polycoated cloth tape, polyester/cloth laminated to a polyethylene backing with a high tack, natural rubber adhesive) had a total thickness including the adhesive layer of about 10 mils. The KAPTON™ tape, KM102 (a polyimide material as described above with an acrylic adhesive) had a total thickness including the adhesive layer of 2.5 mils (the adhesive layer had a thickness of 1 mil). The HM350™ tape (a polytetrafluoroethylene with a silicone adhesive) had a total thickness including the adhesive layer of about 3.5 mils (the adhesive layer had a thickness of 2 mils).

The four belts were cycled at the same speed in the testing fixture of FIG. 1 for the cycles indicated below and with the following results:

| Belt Number | Number of Cycles | Type of Tape | Failure Mode* |
|---|---|---|---|
| first belt | 1,000 | duct tape | duct tape at belt side edge |
| second belt | 10,000 | no tape used | belt side edge |
| third belt | 40,000 | KAPTON ™ KM102 tape | KAPTON ™ tape at belt side edge |
| fourth belt | 175,000 | HM350 ™ tape (polytetrafluoro-ethylene) | test stopped at this number of cycles without failure of belt |

*The phrase Failure Mode refers to cracking or tearing of the tape or the belt.

As seen in the above table, the belt reinforced with HM350™ tape exhibited at least four times better wear resistance along the belt side edges than the next best performance by the the belt reinforced with KAPTON™ KM102 tape.

Other modifications of the present invention may occur to those skilled in the art based upon a reading of the present disclosure and these modifications are intended to be included within the scope of the present invention.

We claim:

1. A belt assembly comprising:

(a) an endless belt capable of repeated cycling over rollers having a center region between a first side region and a second side region, where the first side region includes a first side edge of the belt thickness and the second side region includes a second side edge of the belt thickness, wherein a fluoropolymer composition covers a portion of the length of the first side edge, wherein there is absent the fluoropolymer composition on the surface of the center region; and (b) a belt guide apparatus which contacts the first side edge during cycling of the belt to position the belt on the rollers, wherein the fluoropolymer composition reduces the wear of the belt at the first side edge.

2. The belt assembly of claim 1, wherein the fluoropolymer composition is polymerized from monomers having from one to four carbon atoms.

3. The belt assembly of claim 1, wherein the fluoropolymer composition is selected from the group consisting of polytetrafluoroethylene, fluorinated ethylene-propylene copolymer, tetrafluoroethylene-ethylene copolymer, and perfluoroalkoxy polymer.

4. The assembly of claim 1, wherein the center region is free of any protuberance and any opening.

5. The assembly of claim 1, wherein the fluoropolymer composition covers the entire length of the first side edge.

6. The assembly of claim 1, wherein the fluoropolymer composition also covers the entire length of the second side edge.

7. The assembly of claim 6, wherein the belt guide apparatus contacts the second side edge during cycling of the belt to position the belt on the rollers, wherein the fluoropolymer composition reduces the wear of the belt at the second side edge.

8. The assembly of claim 1, wherein the belt further comprises material selected from the group consisting of electrically conductive particles, thermally conductive particles, and photoconductive material.

9. The assembly of claim 1, wherein the belt is a fusing subsystem member, an intermediate toner image transfer member, a paper transport member, or a photoconductive member.

10. The assembly of claim 1, wherein the fluoropolymer composition covers a portion of the first side region.

11. The assembly of claim 1, wherein the fluoropolymer composition is present only on the first side edge.

12. The assembly of claim 1, wherein the fluoropolymer composition is present only on the first side edge and the second side edge.

13. The assembly of claim 1, wherein the fluoropolymer composition is polytetrafluoroethylene.

* * * * *